J. P. SIMMONS.
INTERNAL COMBUSTION ENGINE.
APPLICATION FILED FEB. 7, 1912.
1,135,330.
Patented Apr. 13, 1915.
2 SHEETS—SHEET 1.
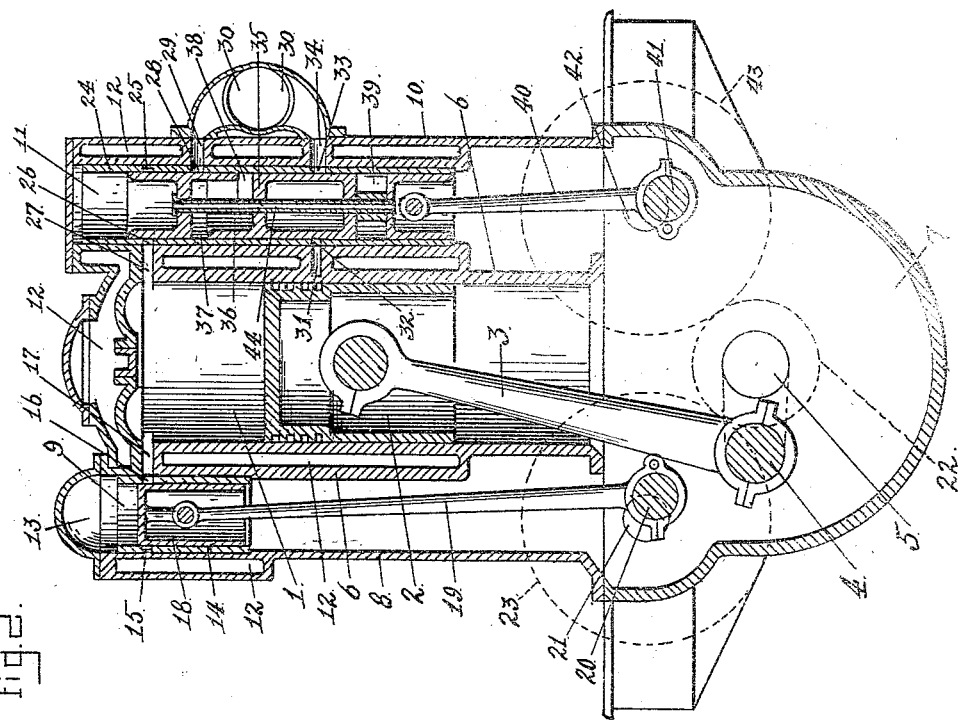
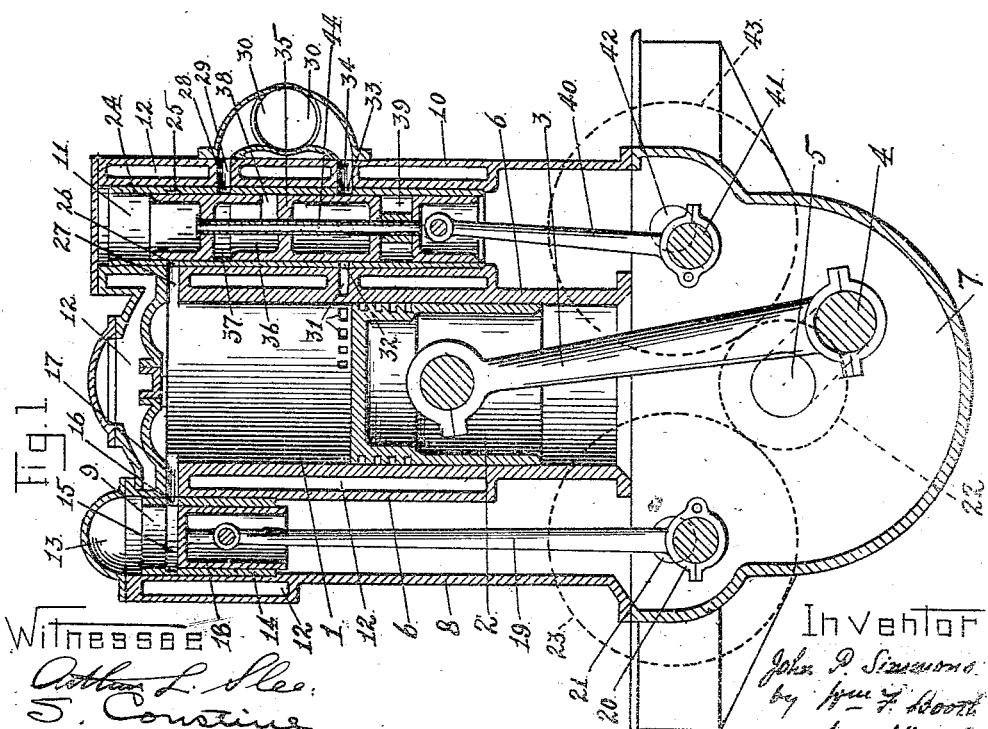
Witnesses
Inventor
John P. Simmons
by Wm. F. Booth
his Attorney

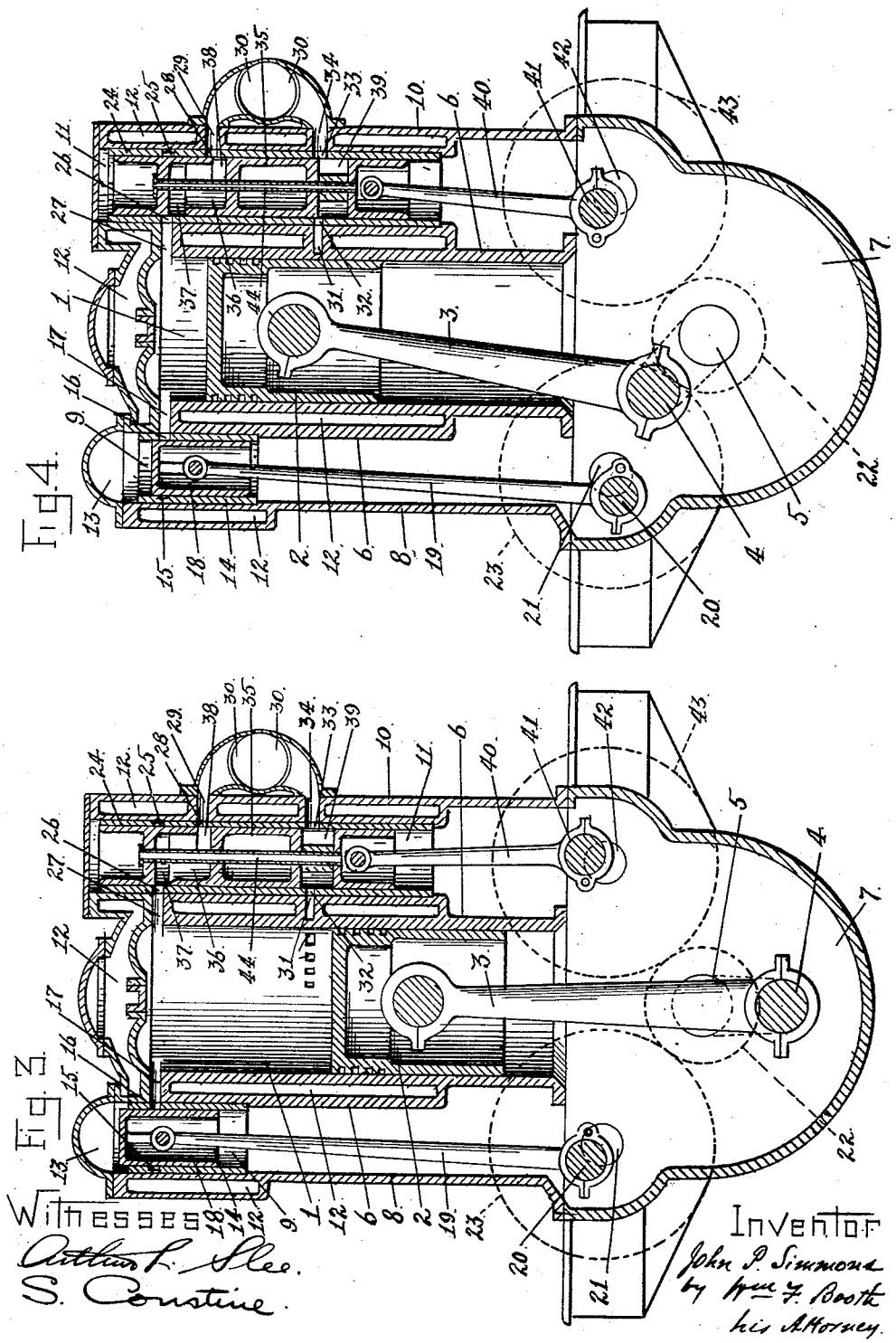

UNITED STATES PATENT OFFICE.

JOHN P. SIMMONS, OF SAN FRANCISCO, CALIFORNIA.

INTERNAL-COMBUSTION ENGINE.

1,135,330.  Specification of Letters Patent.  Patented Apr. 13, 1915.

Application filed February 7, 1912. Serial No. 675,954.

*To all whom it may concern:*

Be it known that I, JOHN P. SIMMONS, a citizen of the United States, residing in the city and county of San Francisco and State of California, have invented certain new and useful Improvements in Internal-Combustion Engines, of which the following is a specification.

My invention relates to the class of internal-combustion engines and more particularly to those engines of this class in which valves other than puppet valves are used.

The object of my invention is to provide an internal combustion engine with a positive valve motion. To this end, I employ valves of the annular piston type, and operate them by eccentric or crank direct, or through bell cranks, or by any other means required by the construction of different types of engines.

My invention consists in the novel construction and arrangement of the piston valves in connection with the internal combustion engine, which I shall now fully describe by reference to the accompanying drawings in which—

Figure 1 is a vertical section of my engine, the piston being on its intake stroke. Fig. 2 is a similar view, the piston being on its compression stroke. Fig. 3 is a similar view, the piston being at the end of its firing stroke. Fig. 4 is a similar view, the piston being on its scavenging stroke.

The engine here shown is of the vertical four-cycle type.

1 is the engine cylinder, 2 is the engine piston, 3 is the piston rod, 4 is the engine crank, 5 is the engine shaft and 6 is the engine shell, at the lower portion of which is the crank case 7. On one side of the shell, parallel with the engine cylinder, is a housing 8, in the upper portion of which is formed the chamber 9 for the intake valve; and on the other side of the shell is another housing 10 parallel with the cylinder and having in its upper portion the chamber 11 for the exhaust valve. Both valve chambers are parallel with the vertical axis of the cylinder, and both are included in the water-jacketing 12 of the engine.

13 is the intake passage which opens into the top of the intake-valve chamber 9. In this chamber 9 is fitted a removable wearing sleeve 14, on the inner surface of which near its upper end is made an encircling pressure-equalizing channel 15, which on the side nearest the cylinder opens through the sleeve and forms a port 16 which registers with the intake port 17 into the upper portion of the engine cylinder 1.

Seated in the sleeve 14 is the intake valve 18 of the annular piston type, adapted by its reciprocation to open and to close the intake port. By reason of the encircling channel 15 which communicates with the intake port 17 through its own port portion 16, the side pressure on the piston valve 18 is equalized and said valve is thus balanced. The intake valve 18 is operated by a rod 19 from a crank 20 on a counter-shaft 21, parallel with the engine shaft and driven by said shaft through a gear 22 on the engine shaft and a gear 23 on the counter-shaft.

In the chamber 11 for the exhaust valve is fitted a removable wearing sleeve 24, which sleeve, near its upper portion, has formed on its inner surface an encircling channel 25, the channel at its side nearest the cylinder being cut through said sleeve to form the port 26 which registers with the scavenging inner exhaust port 27 leading from the upper portion of the engine cylinder. The sleeve 24 on its opposite side and in a horizontal plane lower than the plane in which its port 26 is formed, has a port 28 which registers with the scavenging outer exhaust port 29 leading through the outer wall of the valve chamber 11 to the exhaust passage 30.

In the cylinder 1 just above the lower limit of the piston stroke is the inner lower exhaust port 31, which registers with an inner lower port 32 in the sleeve 24, the other wall of said sleeve in the same plane having the outer lower exhaust port 33, which registers with the outer lower exhaust port 34 in the valve chamber wall, and which said outer port 34 opens into the exhaust passage 30.

In the chamber 11, and seated in the sleeve 24, is the exhaust valve 35. It is a piston valve. In its upper portion it has a scavenging exhaust chamber 36, which at its top on its inner side has a port 37 which is adapted to open and close the inner scavenging exhaust port 26 of the sleeve 24, and said chamber 36 also has at its lower portion on its outer side a port 38 which is adapted to open and close the outer scavenging exhaust port 28 of said sleeve, the control of both ports 26 and 28 being simultaneous. The piston exhaust valve 35 has at its lower portion an annular exhaust port 39 which simultaneously controls both the inner and outer lower exhaust ports 32 and 33 of the sleeve 24. The exhaust valve 35 is reciprocated by a rod 40 which is connected with a crank 41 on a counter-shaft 42, set parallel with the engine shaft, and driven therefrom through the gear 43 on said counter-shaft and the gear 22 on the engine shaft.

The operation of the engine is made clear from the drawings.

In Fig. 1, the piston is on its way down on and has nearly completed the first or intake stroke of the cycle. The intake piston valve 18 has moved down and has opened the intake port 17 to the cylinder. All the exhaust ports, both upper and lower, are closed by the exhaust valve 35.

In Fig. 2, the piston is returning on its second or compression stroke and the valves 18 and 35 have moved to close all the ports.

In Fig. 3, the piston has just finished its third or firing stroke. The intake valve is closed, but the lower and upper exhaust ports are open, and most of the products of the explosion have passed out.

In Fig. 4, the piston is on the way up on and has nearly completed its fourth or scavenging stroke. The intake is closed, and the piston has itself closed the lower exhaust port, but the upper exhaust ports, both inner and outer, are still open, but are about to close, though meanwhile the remaining burnt gases have been scavenged through them. The new cycle then begins. It is to be noted that the encircling channels 15 and 25 which communicate with the interior of the cylinder and surround the piston valves 18 and 35 serve to equalize the side pressure upon them and balance them during the working stroke of the piston.

Concerning the intake piston valve 18 it need only be said that it is so disposed and operated as to control the intake port at a specific point of the stroke of the piston 2 in the engine cylinder. The eccentric or crank which operates this intake valve is so placed that the length of the travel and the time that this travel registers the intake port, is one-sixth of the four strokes of the engine piston and the intake port is kept closed the remaining five-sixths of the four strokes.

The exhaust valve has the most particular work to perform, in that it has to timely open and close the exhaust ports and to keep them positively closed, to prevent pre-ignition of the entering charge of gas through the exhaust port from other cylinders. By having the piston valve 35 here shown, this work is accomplished. By having two sets of exhaust ports, one near the upper end of the cylinder and the other lower down in the cylinder just above the top of the engine piston when at the lower end of its stroke, the lower exhaust port is partly controlled by the engine piston, which opens it at the end of its working stroke in order to discharge the burnt gases (at which time the lower port 39 of the exhaust valve 35 registers with it); but said lower exhaust port is again closed by the ascending engine piston and is held closed by the exhaust valve 35 during the intake stroke, when the engine piston again opens this port.

The port 37 in the upper end of the exhaust valve 35 registers with the cylinder port 27 during the scavenging stroke of the engine piston, when it again closes against the incoming charge of fresh gas. It is to be noted that the scavenger ports 37 and 38 in the exhaust valve 35 are cut on one side to register with the cylinder port 27 and on the other side, lower down, to register with the port 29 into the exhaust passage 30. The object of this is to provide a closing rim in the valve chamber between them. This makes a passage way from the cylinder through the hollow part or chamber 36 of the valve to the exhaust port 29 in the valve chamber, and provides for the complete balancing of the valve during the compression and working part of the piston stroke. Through the exhaust valve 35 lengthwise extends the open ended hollow stem 44. This gives free passage of air, serving the double purpose of cooling the parts and of preventing a vacuum above the piston.

Having thus described my invention what I claim as new and desire to secure by Letters Patent is:—

1. In an internal-combustion engine, the shell thereof having a cylinder with a piston therein, said cylinder having an inlet port on one side and having on its other side an exhaust port near its upper end and a second exhaust port lower down in position to be uncovered by the piston at the end of its downward movement, said shell having on its first named side a valve chamber with which the inlet port communicates, and having on its other side a valve chamber with which the exhaust ports communicate, and having also an exhaust passage with which the last named valve chamber communicates through an upper and a lower port; a reciprocative piston valve seated in the first named valve chamber to control the inlet port; and a reciprocative piston-valve seated in the second named valve chamber and provided with upper and lower ports to respectively control the upper and lower communications of its chamber with the cylinder and the exhaust passage.

2. In an internal-combustion engine, the shell thereof having a cylinder with a piston therein, said cylinder having an inlet port on one side and having on its other side an exhaust port near its upper end and a second exhaust port lower down in position to be uncovered by the piston at the end of its downward movement, said shell having on its first named side a valve-chamber with which the inlet port communicates and having on its other side a valve-chamber with an upper port and a lower port which register respectively with the upper and the lower cylinder exhaust ports, and said shell having also an exhaust passage with which the valve chamber communicates through an upper port and a lower port, said last named upper port coacting with but disposed in a lower horizontal plane than the upper registering ports of the chamber and cylinder and said last named lower port coacting with the lower registering ports of the chamber and cylinder; a reciprocative piston-valve seated in the first named valve-chamber to control the inlet port; and a reciprocative piston-valve seated in the second named valve-chamber and provided with an internal chamber having ports on different horizontal planes to control the upper ports of the valve-chamber whereby a closing rim is formed in the valve-chamber, said piston-valve being also formed with a port to control the lower ports of the valve-chamber.

In testimony whereof I have signed my name to this specification in the presence of two subscribing witnesses.

JOHN P. SIMMONS.

Witnesses:
  WM. F. BOOTH,
  D. B. RICHARDS.